A. P. Baldwin,
Bridle Bit.
No. 97,022. Patented Nov. 23, 1869.
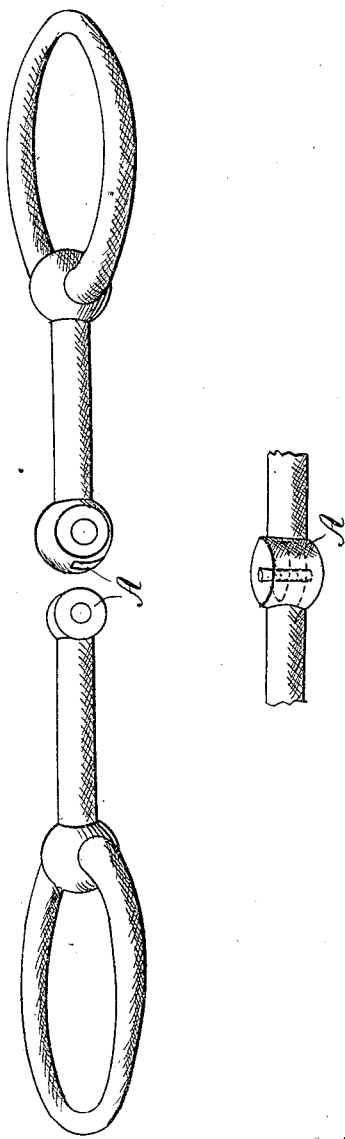
Witnesses
David Martin
Emil Erler
Inventor
Alexander P. Baldwin

United States Patent Office.

ALEXANDER P. BALDWIN, OF NEWARK, NEW JERSEY.

Letters Patent No. 97,022, dated November 23, 1869.

IMPROVEMENT IN MOUTH-PIECE OF BRIDLE-BITS.

The Schedule referred to in these Letters Patent and making part of the same.

To all whom it may concern:

Be it known that I, ALEXANDER P. BALDWIN, of the city of Newark, county of Essex, and State of New Jersey, have invented a Reversible-Jointed Mouth-Piece for Bridle-Bits; and I do hereby declare that the following is a full and exact description thereof, reference being had to the accompanying drawings, and to the letters of reference marked thereon.

The mouth-piece is so constructed, by a reversible joint, marked A in the drawing, as to act in the usual manner of a jointed or snaffle mouth-piece; or, by reversing the bit in the bridle, in consequence of the joint working only to a certain distance, it will act as a stiff or bar mouth-piece, thus combining the features of both a stiff and jointed mouth-piece in one.

What I claim as my invention, and desire to secure by Letters Patent, is—

A bridle-bit, provided with an elbow or rule-joint, so that it may be used as a jointed or bar-bit, substantially as herein described.

ALEXANDER P. BALDWIN.

Witnesses:
   DAVID MARTIN,
   EMIL ERLER.